C. G. KOPPITZ.
MEANS FOR TRANSFERRING HIGH POTENTIAL ELECTRIC CURRENTS AS INTERRUPTED ARCS.
APPLICATION FILED SEPT. 23, 1913.

1,183,883. Patented May 23, 1916.

Witnesses
Robert J. Hulsizer
C. H. Potter

Inventor
Carl G. Koppitz,
by Byrnes, Townsend & Kinkelstein,
Attorneys.

UNITED STATES PATENT OFFICE.

CARL G. KOPPITZ, OF WILKINSBURG, PENNSYLVANIA.

MEANS FOR TRANSFERRING HIGH-POTENTIAL ELECTRIC CURRENTS AS INTERRUPTED ARCS.

1,183,883. Specification of Letters Patent. Patented May 23, 1916.

Application filed September 23, 1913. Serial No. 791,312.

*To all whom it may concern:*

Be it known that I, CARL G. KOPPITZ, a citizen of the United States, residing at Wilkinsburg, in the county of Allegheny and State of Pennsylvania, have invented certain new and useful Improvements in Means for Transferring High-Potential Electric Currents as Interrupted Arcs, of which the following is a specification.

In my applications Serial Numbers 646,988, filed August 31, 1911, and 724,963, filed October 10, 1912, I have described a process of and apparatus for interconverting direct and alternating currents, having a potential of from one or two thousand up to several hundred thousand volts, by synchronously transferring unidirectional currents as arcs between rotating distributers connected to the source of direct current and fixed commutator-segments connected by spaced leads to different portions of a closed alternating-current winding, the distributers being driven in synchronism with the alternating-current phases.

The present invention relates to means for extinguishing the arcs as soon as the distributers pass the fixed segments.

Figure 1:
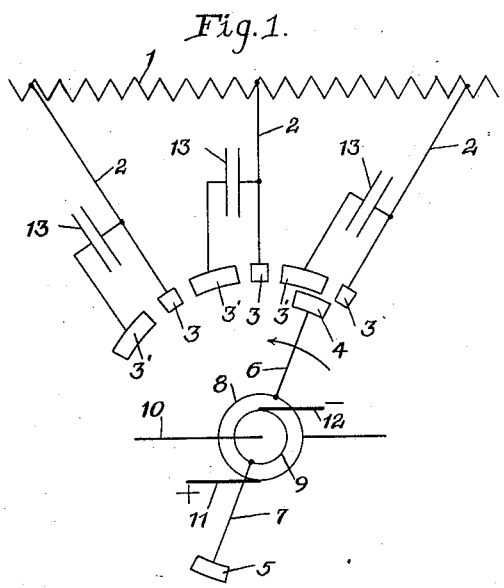
Figure 2:
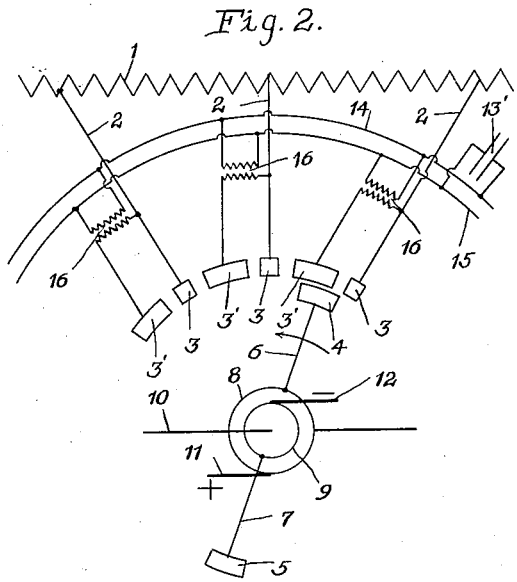
Figure 3:
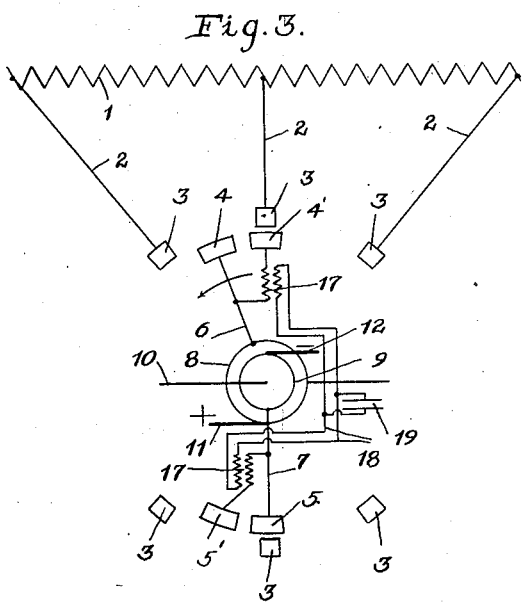
Figure 4:
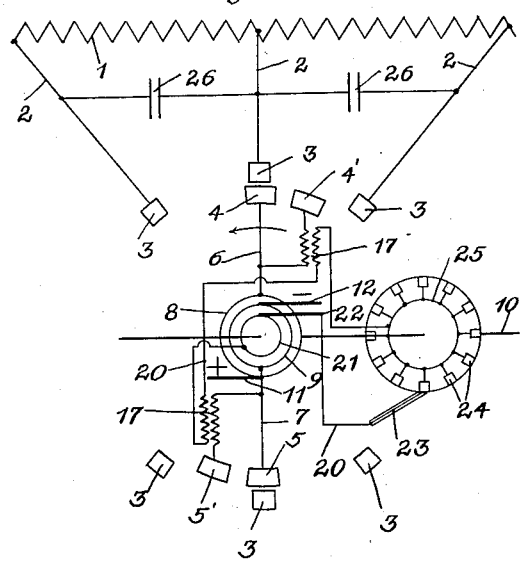

Referring to the accompanying drawings:—Figure 1 is a diagrammatic view of a converter having fixed alternating-current terminals consisting of pairs of successive members electrically in parallel, the means for extinguishing the arcs consisting of a condenser in the circuit of the second terminal of each pair; Fig. 2 illustrates the same converter as that of Fig. 1, but the means for extinguishing the arcs is a single condenser, operatively associated, through transformers, with the circuits of the second member of every pair of alternating-current terminals; Fig. 3 illustrates a converter employing single fixed terminals and pairs of rotating direct-current terminals, the terminals of like sign being electrically in parallel, and the means for extinguishing the arcs being a condenser operatively associated, through transformers, with the circuits of the trailing terminals; and Fig. 4 illustrates the same converter as that of Fig. 3, but the means for extinguishing the arcs is a mechanical interrupter, operatively associated, through transformers, with the circuits of the trailing terminals.

The converter illustrated in Fig. 1 comprises an alternating-current winding 1, from which spaced leads 2 extend inward to a circular row of fixed segments, arranged in pairs 3, 3'. The revolving terminals 4, 5 of opposite polarity are connected by leads 6, 7 to slip-rings 8, 9, carried by a shaft 10. Brushes 11, 12 bear on these rings. A condenser 13 is interposed in parallel between each of the leads 2 and the second member 3' of each pair of terminals. As the distributer 4 shifts from the first terminal 3 to the second terminal 3', the condenser 13 becomes charged, opposing further flow of current at this point. As the terminal 4 passes onward toward the second terminal 3, the charge of the condenser becomes sufficiently high to aid the current in arcing from terminal 4 to the second terminal 3, and then to extinguish the arc at terminal 3'. The condenser remains charged until the revolving terminal 5, of opposite polarity, arrives at its terminal 3', whereupon it is discharged and recharged in the opposite direction until its potential is again sufficiently high to cause the arc to strike to the next terminal 3. Each condenser is thus alternately charged first in one direction and then in the other, as the terminals 4, 5 revolve past its terminal 3'.

Fig. 2 illustrates the same converter as Fig. 1, except that the several condensers 13 are replaced by a single condenser 13'. The plates of this condenser are connected, by wires 14, 15, successively in opposite directions to one winding of several transformers 16, the other winding of each of which is connected to a fixed terminal 3', by a circuit from lead 2, paralleling that to terminal 3'. The connection of the condenser to successive transformers in opposite directions causes it to become charged in opposite directions as the revolving terminals pass consecutive terminals 3'. In order to thus employ a single condenser, operating simultaneously with the two revolving terminals of opposite polarity, it is necessary that the total number of fixed terminals be a number divisible by three, and also divisible by two to give a quotient which is an odd number, *e. g.*, 18, 30, 42, etc. The voltage of all transformers connected to the wires 14, 15 will vary simultaneously, but only those two opposed transformers under the influence of the two revolving terminals will at any instant be carrying the main current; all the other transformers will take only sufficient exciting current to build up the necessary counter E. M. F.

Fig. 3 illustrates a converter which is provided with single fixed alternating-current terminals 3 but with two revolving terminals 4, 4' and 5, 5' of opposite polarity. The second terminal of each revolving pair is connected to the lead 6 or 7, in parallel with the connection to the terminal 4 or 5, through one winding of one of two transformers 17, the other windings of which are connected through a circuit 18 to a condenser 19. These auxiliary revolving terminals 4', 5' perform the same function as the auxiliary fixed terminals 3' of Figs. 1 and 2, and the condenser 19 extinguishes the arcs in the same manner as does the condenser 13' of Fig. 2. Since the described condensers serve simply as a means for interrupting the current and extinguishing the arc at the second of each pair of terminals, any other interrupter may be substituted therefor, provided that it acts at the proper time and that the interruption is not so sudden as to cause excessive voltage strains in the alternating-current windings.

Fig. 4 illustrates a converter which is identical with that of Fig. 3, except that a mechanical interrupter is substituted for the condenser. One winding of each transformer 17 is connected through a circuit comprising leads 20, slip-ring 21, and brush 22 to the interrupter. This device comprises a brush 23 and a circular row of insulated segments 24 connected back to the circuit 20 by a common wire 25. The segments are mounted on the shaft 10 which carries the revolving converter-terminals, the interruptions being thereby properly timed. To prevent undue strains upon the converter windings 1, condensers 26 may be interposed between each pair of adjacent leads 2. The arcs between the brush 23 and segments 24 may be extinguished by any usual means, for example a magnetic blowout.

I claim:—

1. Means for transferring high-potential currents as interrupted arcs, comprising sets of relatively movable terminals in arcing proximity, one set of terminals consisting of pairs of successive members electrically in parallel, and means aiding in establishing arcs, and for extinguishing the arcs between the second terminal of each pair and the opposing terminal.

2. Means for transferring high-potential currents as interrupted arcs, comprising sets of relatively movable terminals in arcing proximity, one set of terminals consisting of pairs of successive members electrically in parallel, and means aiding in establishing arcs, and for extinguishing the arcs between the second terminal of each pair and the opposing terminal, consisting of a condenser in operative relation to the circuit of each of said second terminals.

3. In combination with a converter for high-potential currents, consisting of an alternating-current winding, spaced leads extending from said winding to a set of terminals, and a direct-current distributer having terminals arranged in arcing proximity to the alternating-current terminals, said alternating-current and direct-current terminals being relatively revoluble and one set of terminals consisting of pairs of successive members electrically in parallel, means aiding in establishing arcs, and for extinguishing the arcs between the second terminal of each pair and the opposing terminal.

4. In combination with a converter for high-potential currents, consisting of an alternating-current winding, spaced leads extending from said winding to a set of terminals, and a direct-current distributer having terminals arranged in arcing proximity to the alternating-current terminals, said alternating-current and direct-current terminals being relatively revoluble and one set of terminals consisting of pairs of successive members electrically in parallel, means aiding in establishing arcs, and for extinguishing the arcs between the second terminal of each pair and the opposing terminal, consisting of a condenser in operative relation to the circuit of each of said second terminals.

In testimony whereof I affix my signature in presence of two witnesses.

CARL G. KOPPITZ.

Witnesses:
C. F. SPERLING,
EDW. A. JENKINS.